United States Patent

(10) Patent No.: US 9,329,820 B2
(45) Date of Patent: May 3, 2016

Nakamura

(54) PRINT CONTROL DEVICE, PRINTING SYSTEM, AND PRINT CONTROL METHOD

(71) Applicant: Seiko Epson Corporation, Tokyo (JP)

(72) Inventor: Hideo Nakamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/249,966

(22) Filed: Apr. 10, 2014

(65) Prior Publication Data

US 2014/0313532 A1    Oct. 23, 2014

(30) Foreign Application Priority Data

Apr. 23, 2013   (JP) .................................. 2013-090118

(51) Int. Cl.
   *G06F 3/12*   (2006.01)

(52) U.S. Cl.
   CPC .............. *G06F 3/1259* (2013.01); *G06F 3/121* (2013.01); *G06F 3/1228* (2013.01); *G06F 3/1234* (2013.01); *G06F 3/1246* (2013.01); *G06F 3/1276* (2013.01); *G06F 3/1279* (2013.01); *G06F 3/1288* (2013.01); *G06F 3/126* (2013.01)

(58) Field of Classification Search
   CPC ..... G06F 3/1259; G06F 3/1234; G06F 3/121; G06F 3/1279; G06F 3/1228; G06F 3/1276; G06F 3/1288; G06F 3/1246; G06F 3/126
   USPC .................................................. 358/1.15, 1.13
   See application file for complete search history.

(56) References Cited

U.S. PATENT DOCUMENTS

| | | | |
|---|---|---|---|
| 5,684,607 A | 11/1997 | Matsumoto | |
| 5,987,224 A | 11/1999 | Koakutsu et al. | |
| 6,064,491 A | 5/2000 | Matsumoto | |
| 6,147,765 A * | 11/2000 | Yoneda | 358/1.15 |
| 7,271,924 B1 | 9/2007 | Takamizawa et al. | |
| 2001/0024585 A1 | 9/2001 | Koakutsu et al. | |
| 2002/0186401 A1 | 12/2002 | Matsumoto | |
| 2004/0239972 A1* | 12/2004 | Nguyen et al. | 358/1.13 |
| 2005/0013643 A1 | 1/2005 | Fukano | |
| 2005/0232031 A1 | 10/2005 | Fukano | |
| 2007/0296999 A1 | 12/2007 | Takamizawa et al. | |
| 2013/0176589 A1 | 7/2013 | Nakamura | |
| 2013/0286425 A1 | 10/2013 | Nakamura et al. | |

FOREIGN PATENT DOCUMENTS

| | | |
|---|---|---|
| EP | 0738596 A1 | 10/1996 |
| JP | 05-014580 | 1/1993 |
| JP | 09-314962 | 12/1997 |
| JP | 2001-180052 | 7/2001 |
| JP | 2002-163083 | 6/2002 |
| JP | 2005-007762 | 1/2005 |
| JP | 2005-343028 | 12/2005 |

(Continued)

*Primary Examiner* — Kent Yip

(57) ABSTRACT

A print control device, printing system, and print control method can reliably execute desired operations according to the status of the printer. A print data receiving unit 81 receives print data including mode information from a host 20; a status acquisition unit 82 gets the status of a printer 32; a decision unit 83 determines if the mode information and the status of the printer 32 meet an execution condition; and a printer control unit 84 changes the printer 32 to a specific mode and sends commands generated from the print data to the printer 32 when the decision unit 83 determines the execution condition is met.

12 Claims, 8 Drawing Sheets

(56) References Cited

FOREIGN PATENT DOCUMENTS

| | | |
|---|---|---|
| JP | 2009-015747 | 1/2009 |
| JP | 2012-168637 | 9/2012 |
| JP | 2013-127731 | 6/2013 |
| JP | 2013-210885 | 10/2013 |
| JP | 2013-214227 | 10/2013 |
| JP | 2013-214228 | 10/2013 |
| WO | 2013/147314 A1 | 10/2013 |

* cited by examiner

```
<print>
    <pulse/>                          ... KICK OUT DRAWER
    <text>Receipt</text>              ... PRINT TEXT
    <feed/>                           ... LINE FEED
    <barcode type="code39">12345</barcode>   ... PRINT BARCODE
    <cut/>                            ... CUT PAPER
</print>
```
(a) EXAMPLE OF NORMAL TRANSMISSION

```
<print force="true">
    <recovery/>        ... RECOVER FROM ERROR, CLEAR BUFFER
</print>
```
(b) EXAMPLE OF FORCED TRANSMISSION

```
<print>
    <pulse/>       ... (ESC/POS) NORMAL COMMAND
</print>
<print force="true">
    <pulse/>       ... (ESC/POS) REAL-TIME COMMAND
</print>
```
(c) EXAMPLE OF COMMAND OUTPUT BASED ON MODE INFORMATION

```
<print force="true">
    <pulse/>               ... KICK OUT DRAWER, SOUND BUZZER
    <recovery/>            ... RECOVER FROM ERROR, CLEAR BUFFER
    <sound type="none"/>   ... STOP BUZZER
</print>
```
(d) EXAMPLE OF COMMANDS VALID WHEN OFF-LINE

FIG. 7

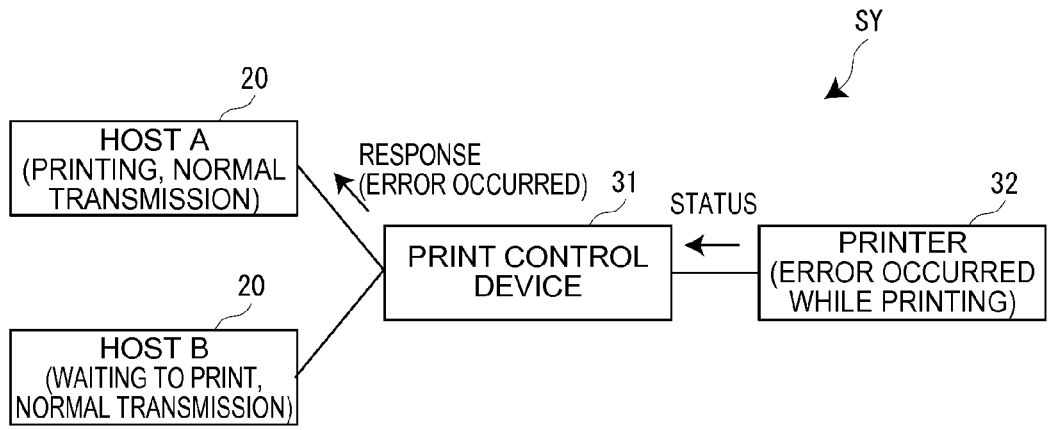
(a) ERROR OCCURS WHILE PRINTING
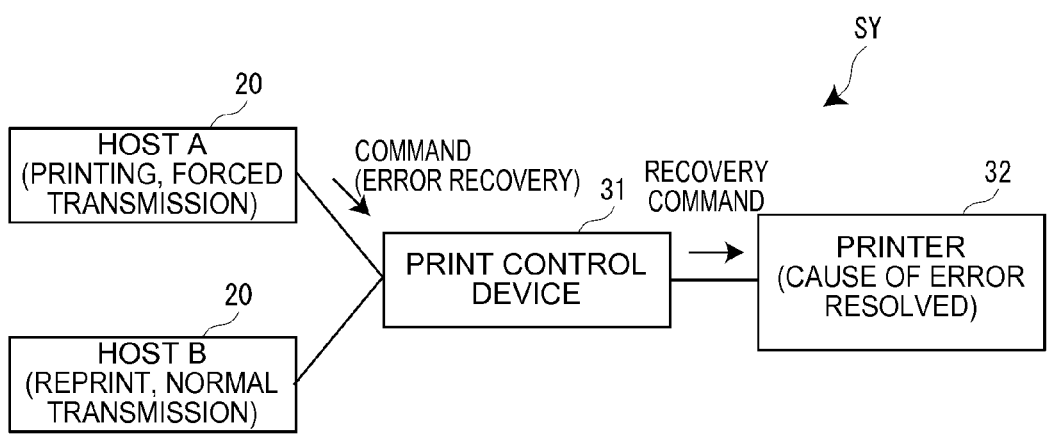
(b) WHEN ERROR HAS OCCURRED
FIG. 8

PRINT CONTROL DEVICE, PRINTING SYSTEM, AND PRINT CONTROL METHOD

1. TECHNICAL FIELD

The present disclosure relates to a print control device, to a printing system, and to a print control method that converts print data received from a host to commands and send the commands to a printer.

2. RELATED ART

ESC/POS® commands are de facto industry standard printing control commands for controlling printers (receipt printers) from a POS (point of sales) terminal (see, for example, JP-A-2005-343028).

ESC/POS® commands, however, assume a 1:1 connection between the POS terminal and the printer. As a result, problems occur when there is a many-to-one or a many-to-many relationship between POS terminals and printers connected over a network. For example, if an error occurs while printing based on a print command from POS terminal A and a print command is received from POS terminal B before the error has been resolved, the print command from POS terminal B cannot be processed normally. Conversely, maintenance commands from POS terminal A may not be processed normally when a print command is received from POS terminal B.

In the configuration of the related art, the printer can only receive print control commands when on-line. More specifically, the printer cannot receive special control commands (real-time commands such as a clear print data command, error recovery command, and start/stop buzzer command) that are used when the printer is off-line or an error has occurred.

SUMMARY

A print control device, printing system, and print control method according to the present disclosure enable executing desired operations according to the status of the printer.

A print control device according to the disclosure includes: a reception unit configured to receive print data including mode information; a status acquisition unit configured to acquire the status of a printer; a decision unit configured to determine if the mode information contained in the print data and the status of the printer acquired by the status acquisition unit are execution condition; and a printer control unit configured to send a command generated based on the mode information and print data to the printer when the decision unit determines the execution condition is met.

A printing system according to the disclosure includes: a host configured to send print data including mode information; a printer configured to print; and a print control device including a reception unit configured to receive the print data sent by the host, a status acquisition unit configured to acquire the status of the printer, a decision unit configured to determine if the mode information contained in the print data and the status of the printer acquired by the status acquisition unit are execution condition, and a printer control unit configured to send a command generated based on the mode information and the print data to the printer when the decision unit determines the execution condition is met.

A print control method according to the disclosure includes: receiving print data including mode information, and acquiring the status of a printer; determining if an execution condition is satisfied based on the mode information contained in the print data and the status of the printer; and when the execution condition is satisfied, sending a command generated based on the mode information and print data to the printer.

When print data is received from a host, these aspects of the disclosure determine if the mode information and printer status meet an execution condition, and can execute a desired operation if the execution condition is determined to be met. For example, if the execution condition is set according to an off-line state or an off-line state and mode information corresponding to an error state, desired commands (special control commands that are used in an off-line state or when an error occurs) can be executed even when the printer is off-line.

Note that commands include both print execution commands that cause the printer to execute a print operation, and control commands that cause the printer to execute specific operations other than printing (such as cancelling an error or controlling a peripheral).

The print data is preferably written in markup language (such as XML, HTML, XHTML). This configuration can be applied to various platforms because of the high versatility of such languages. The host could be a tablet computer, embedded device, or other device that runs on a driverless platform.

The print control device also has an execution result acquisition unit that acquires the result of executing the command from the printer; and a response unit configured to send the execution result.

Because this configuration returns the result of the printer executing a command to the host, the host can know that the command was processed normally.

When the decision unit of the print control device determines the execution condition is not met, the printer control unit does not send the command to the printer, and the response unit sends response data indicating the execution condition is not met.

Because this configuration does not send a command to the printer when the execution condition is not met, erroneous operation of the printer can be prevented. In addition, because response data indicating that the execution condition is not met is sent to the host, the host can also know the same.

In the print control device described above, the mode information is first mode information that causes the printer to execute a print execution command when in the on-line state, or second mode information that sends a print control command to the printer when in the off-line state.

By setting mode information and the printer status as the execution condition, this configuration can cause the printer to execute real-time commands that are used when off-line and when an error occurs even when the printer is off-line. When the first mode information is specified, the printer is first changed to the real-time command execution mode and a command is sent, and the printer is then reset to the normal command execution mode, and processing subsequent print commands is therefore not affected.

In the above print control device, the printer control unit generates commands from print data based on mode information.

This aspect of the disclosure can generate commands appropriate to the mode information. For example, normal commands could be generated when the second mode information is specified, and real-time commands generated when the first transmission mode is specified. As a result, the same elements can be commonly used in plural modes when the print data is written in markup language, for example.

BRIEF DESCRIPTION OF DRAWINGS

FIG. 7 (a) shows an example of print data that is sent during a normal data transmission mode, (b) shows an example of print data that is sent in a forced transmission mode, (c) shows an example of print data when outputting commands according to the mode information, and (d) shows an example of print data containing commands that are valid in an off-line state.

FIG. 8 (a) shows the process flow when an error occurs, and (b) shows the process flow when an error has not been resolved.

DESCRIPTION OF EMBODIMENTS

A printing system SY according to the present disclosure is described below with reference to accompanying figures. A print application and printer driver written for the operating system of the terminal device is normally required for each OS in order to print from a tablet computer or smartphone. In contrast, the printing system SY according to the disclosure installs an XML (Extensible Markup Language]) web service print function (print control device) that is equivalent to a printer driver in the printer, and thereby enables printing independently of the OS. More specifically, the printer can be operated using a web browser without installing a dedicated printer driver on the host. Below, a printer having this XML web service print function is called an "intelligent printer." In contrast, a printer not having this XML web service print function is simply called a printer.

Figure 1:
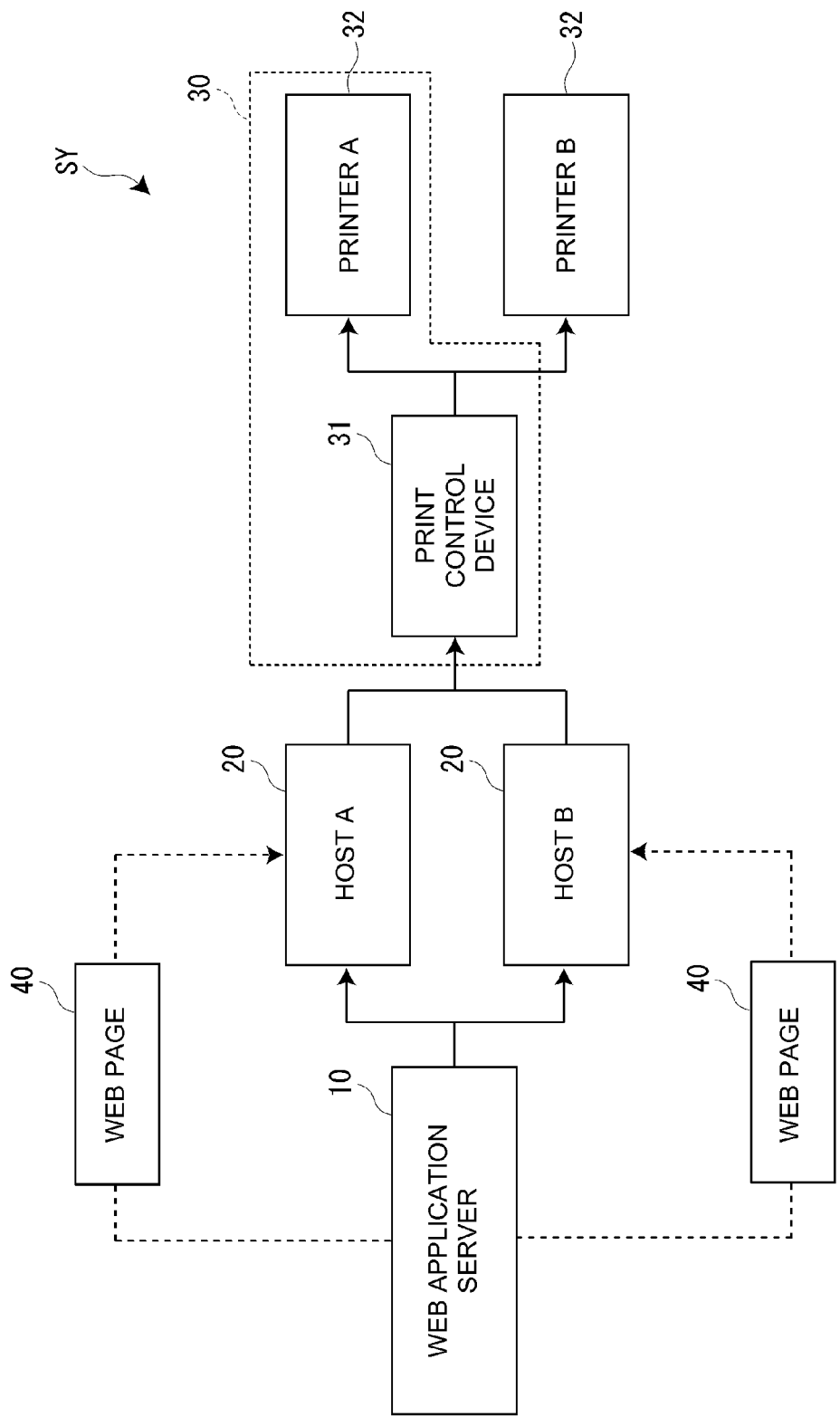
FIG. 1 is a system configuration diagram of a printing system according to a preferred embodiment of the disclosure.

The general configuration of the printing system SY is described first below with reference to FIG. 1 to FIG. 4. FIG. 1 is a system configuration diagram of the printing system SY. This printing system SY has a web application server 10, a plurality of hosts 20 (host a, host b), a print control device 31, and a plurality of printers 32 (printer A, printer B). Note that the print control device 31 and one printer 32 (printer A) are included in the printing system SY as an intelligent printer 30. As a result, printer A and printer B are in a master-slave relationship.

The web application server 10 and hosts 20 are connected over the Internet or other network. The hosts 20 and print control device 31 are connected over a wired or wireless local area network (LAN) or other network. The host 20 is a POS (point of sale) terminal installed at the checkout register in a retail business, or an ordering terminal used on the sales floor of a restaurant, for example. The intelligent printer 30 and printer 32 are, for example, receipt printers that print sales receipts, or kitchen printers installed in a kitchen.

Figure 2A:
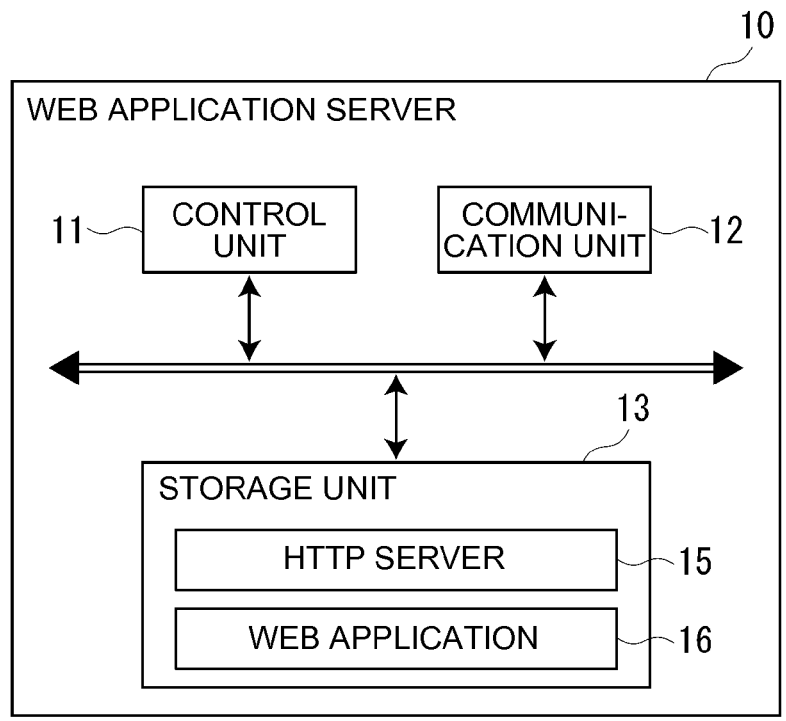
FIG. 2A is a control block diagram of a web application server.
Figure 2B:
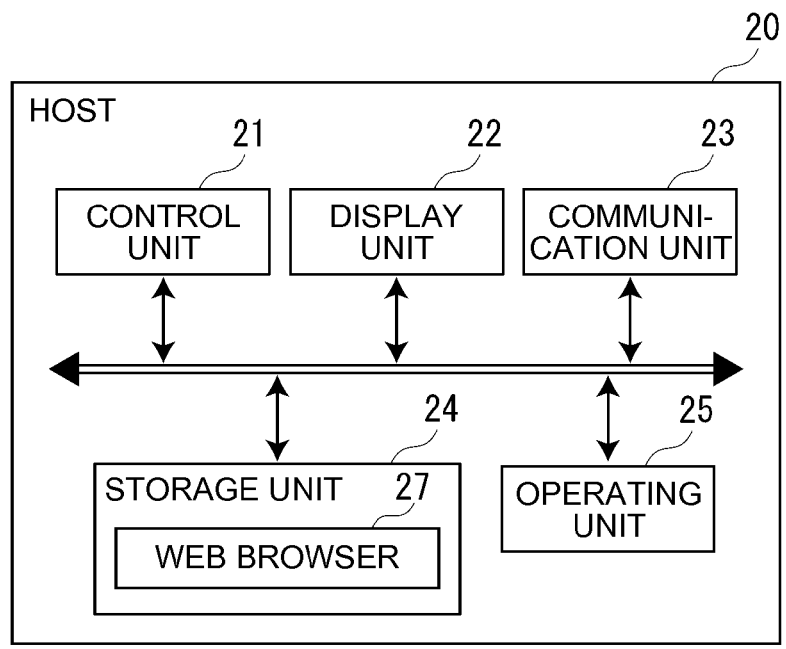
FIG. 2B is a control block diagram of a host.

The control configurations of the web application server 10, hosts 20, and intelligent printer 30 are described next with reference to FIG. 2 and FIG. 3. FIG. 2 (a) shows the control configuration of the web application server 10. The web application server 10 includes a control unit 11, communication unit 12, storage unit 13, and other hardware components not shown that are generally included in a computer. The control unit 11 is embodied by a CPU (central processing unit), ROM (read only memory), and RAM (random access memory). The storage unit 13 is a HDD (hard disk drive), for example, and stores a HTTP (Hypertext Transfer Protocol) server 15 and web application 16.

The communication unit 12 is an interface for communicating with the host 20 (web browser 27). Communication between the web application server 10 and host 20 is controlled by the HTTP server 15 using HTTP (Hypertext Transfer Protocol). More specifically, the web application server 10 receives an HTTP request from the host 20 (web browser 27), and based on the URL (Uniform Resource Locator) contained in the HTTP request, sends a web page 40 (see FIG. 1) provided by the web application 16 to the host 20.

A page control script (JavaScript®) that controls the web page 40, and a print control script for controlling printing, are embedded in the web page 40. The host 20 executes a printing process by running the print control script through the web browser 27 (on the web page 40).

FIG. 2 (b) shows the control configuration of the host 20. The host 20 has a control unit 21, display unit 22, communication unit 23, storage unit 24, and operating unit 25. The control unit 21 includes a CPU, and controls host 20 operation.

The display unit 22 displays a web page 40 acquired (downloaded) by the web browser 27 in the web browser 27, and displays windows for reporting events accompanying operations performed in the web browser 27, and windows for configuring settings. The operating unit 25 is used for operations including issuing printing instructions on a web page 40 displayed by the web browser 27. For example, when the host 20 is a POS terminal and the web application 16 is a POS application, the results of reading barcodes (the name, price, and quantity of purchased products, for example) and transaction results are displayed as a web page 40. A print command is also issued by pressing an enter key on the host 20 (operating the operating unit 25). Note that the display unit 22 and operating unit 25 can be configured as separate hardware devices or together as a touch panel.

The communication unit 23 is an interface for communicating with the web application server 10 and print control device 31. As described above, the host 20 communicates with the web application server 10 and print control device 31 by HTTP.

The storage unit 24 is a hard disk drive, for example, and stores the web browser 27. In this embodiment a simple browser (standard browser) that does not support plugin modules is used as the web browser 27. The control unit 21 uses this web browser 27 to access the web application server 10 through the communication unit 23, and acquire a web page 40 provided by the web application 16.

The web page 40 includes a page control script (JavaScript®) and print control script (JavaScript®) as described above. When the web browser 27 receives a print instruction from the user through the page control script embedded in the web page 40, the web browser 27 executes the print control script embedded in the same web page 40, and generates and sends print data written in XML (markup language) to the print control device 31.

Note that the host 20 is a computer on which the web browser 27 runs, and may be a POS terminal, tablet computer, smartphone, personal computer, or other type of device. In addition, because the host 20 is a driverless configuration as described above, any operating system can be used. A plurality of hosts 20 that operate on different platforms can therefore coexist in the same printing system SY.

Figure 3:
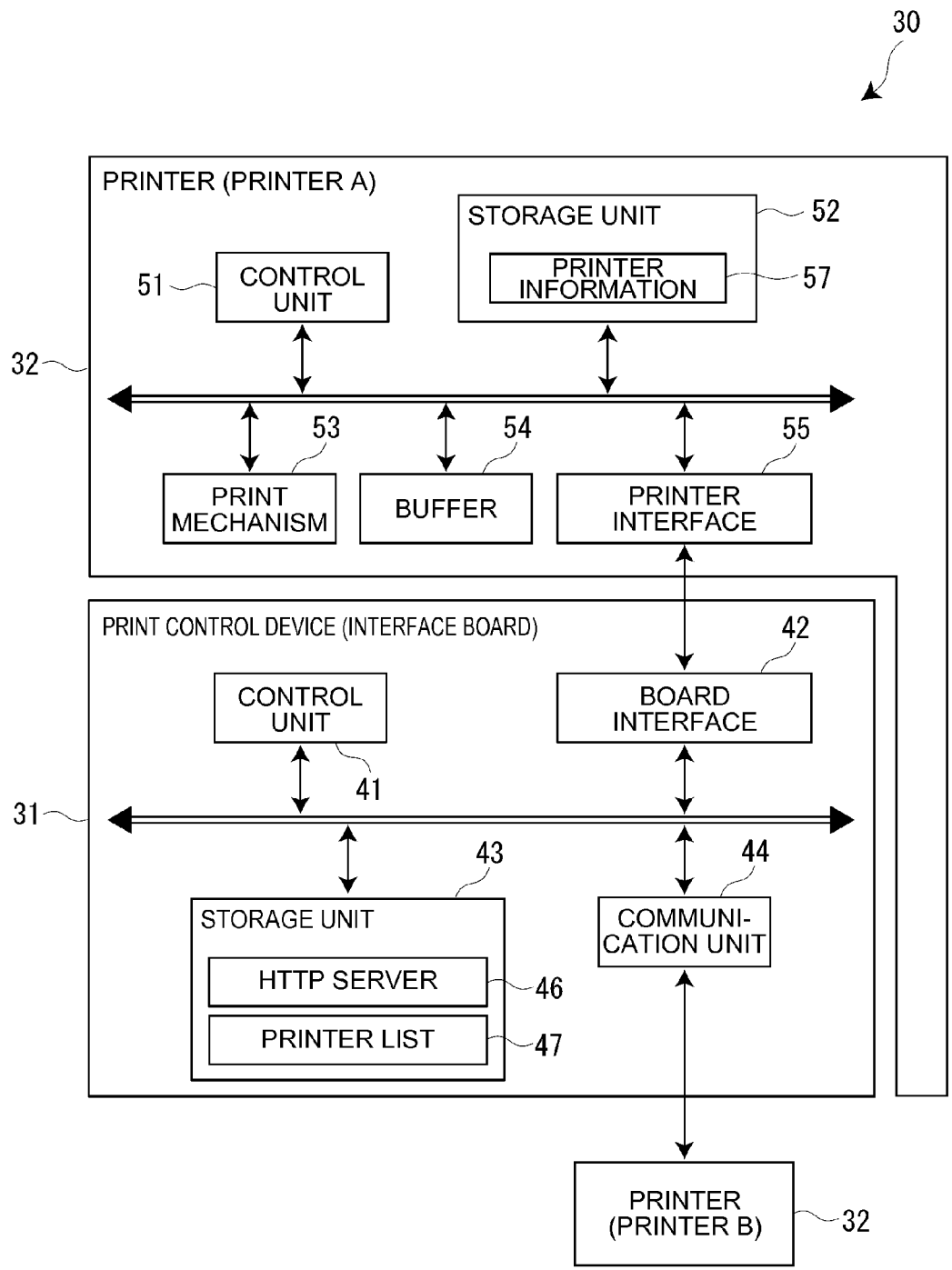
FIG. 3 is a control block diagram of an intelligent printer.

FIG. 3 shows the control configuration of the intelligent printer 30. As described above, the intelligent printer 30 combines the print control device 31 and a printer 32. The print control device 31 in this embodiment is an interface board that is removably installed in the printer 32. The print control device 31 could alternatively be a discrete control box that is externally attached (connected) to the printer 32.

The print control device 31 has a control unit 41, board interface 42, storage unit 43, and communication unit 44. The control unit 41 includes a CPU and controls operation of the print control device 31. The board interface 42 communicates with the printer 32 (printer interface 55). The storage unit 43 is nonvolatile memory (such as flash ROM), for example, and stores an HTTP server 46 and printer list 47. The printer list 47 is a list of printer information 57 for each printer 32. The print control device 31 communicates with each connected printer 32 (printer A, printer B), and acquires and stores printer information 57 such as the model and installed character set in the printer list 47.

The communication unit 44 communicates with the host 20 and other printer 32 (printer B), and includes interfaces such as a LAN interface and a USB interface, for example. Communication between the print control device 31 and host 20 (web browser 27) is handled by the HTTP server 46 using HTTP. More specifically, when print data is sent from the host 20 to the service endpoint address (a URL such as http://x.x.x.x/) uniquely assigned to the print control device 31, the print control device 31 receives the print data.

The print control device 31 converts the received print data (XML document) to print control commands (ESC/POS® commands) for the printer 32, and outputs to the printers 32. Printer identification information (ID) for the printer 32 selected for printing is also included in the service endpoint address. The print control device 31 sends the print control command addressed to the printer 32 identified by the printer ID. Note that when a crossdomain (crossOrigin) request is received from the print control script running on the web browser 27 of the host 20, the print control device 31 responds (XML document) to allow the request.

The printer 32 has a control unit 51, storage unit 52, print mechanism 53, buffer 54, and printer interface 55. The control unit 51 includes a CPU and controls printer 32 operation. The storage unit 52 stores the printer information 57 (including the printer 32 model and installed characters). The print mechanism 53 includes the printhead, paper feed mechanism, and paper cutter mechanism, and performs print operations as controlled by the control unit 51. Note that the printing method could be an inkjet, laser, or other type of printing method.

The buffer 54 is a receive buffer that temporarily stores received data (print control commands). The print mechanism 53 sequentially reads and prints the data stored in the buffer 54 in response to normal commands. Real-time commands are executed immediately regardless of any data stored in the buffer 54. The printer interface 55 communicates with the print control device 31 (board interface 42). The printer 32 performs specific operations based on print control commands received from the print control device 31 through the printer interface 55. The printer 32 also outputs the result of command execution through the printer interface 55 to the print control device 31. When a status acquisition command is sent as the print control command, the printer 32 detects and sends the internal state (status) of the printer to the print control device 31. The print control device 31 then converts the command execution result, status or other command response to an XML document, and returns the XML document to the host 20.

Figure 4:
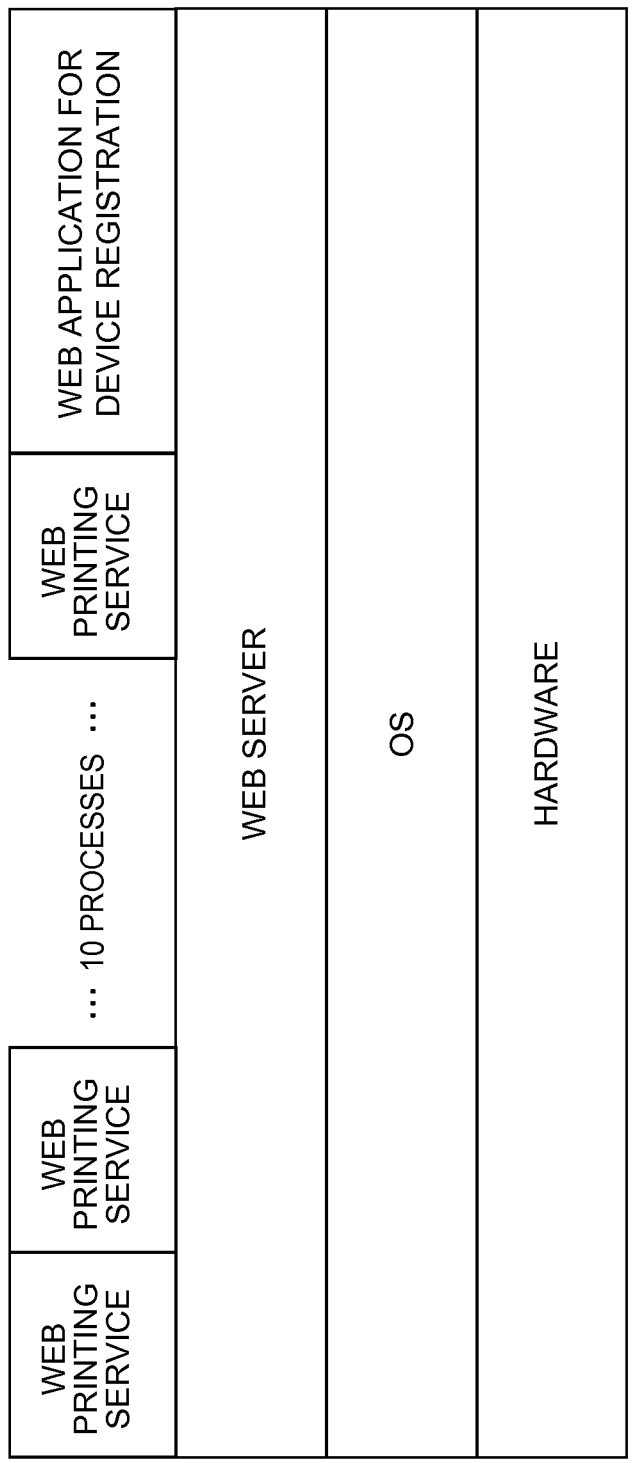
FIG. 4 shows implementation layers of the print control device.

The implementation layers of the print control device 31 are described next with reference to FIG. 4. From the bottom up, the implementation layers of the print control device 31 include hardware, the operating system, the web server (HTTP server 46), and a plurality of web service print functions (XML web service print functions) and a device registration web application on the top layer.

A print web service is a function that includes converting from XML documents to print control commands, and constitutes an important part of this embodiment. By providing a plurality of print web services, a plurality of processes can be executed in parallel, including receiving print data from a plurality of hosts 20 and printing from a plurality of printers 32, and returning print results from each printer 32 to the host 20 that sent the print data. For example, because there are ten print web service processes in the example shown in the figure, ten processes (threads) can be processed simultaneously. However, when data for plural print jobs is sent to a single printer 32, the print jobs are processed in the order in which printing permission is received (the order in which the printer port is acquired).

The device registration web application is an application for registering the printer identification information (ID), model, and port information (IP address) of a printer 32. This information is registered by presenting a configuration page (web page) provided by the HTTP server 46 on the web browser 27 for the user to input the information using the operating unit 25. The registered information is then stored in the printer list 47 (see FIG. 3).

Figure 5:
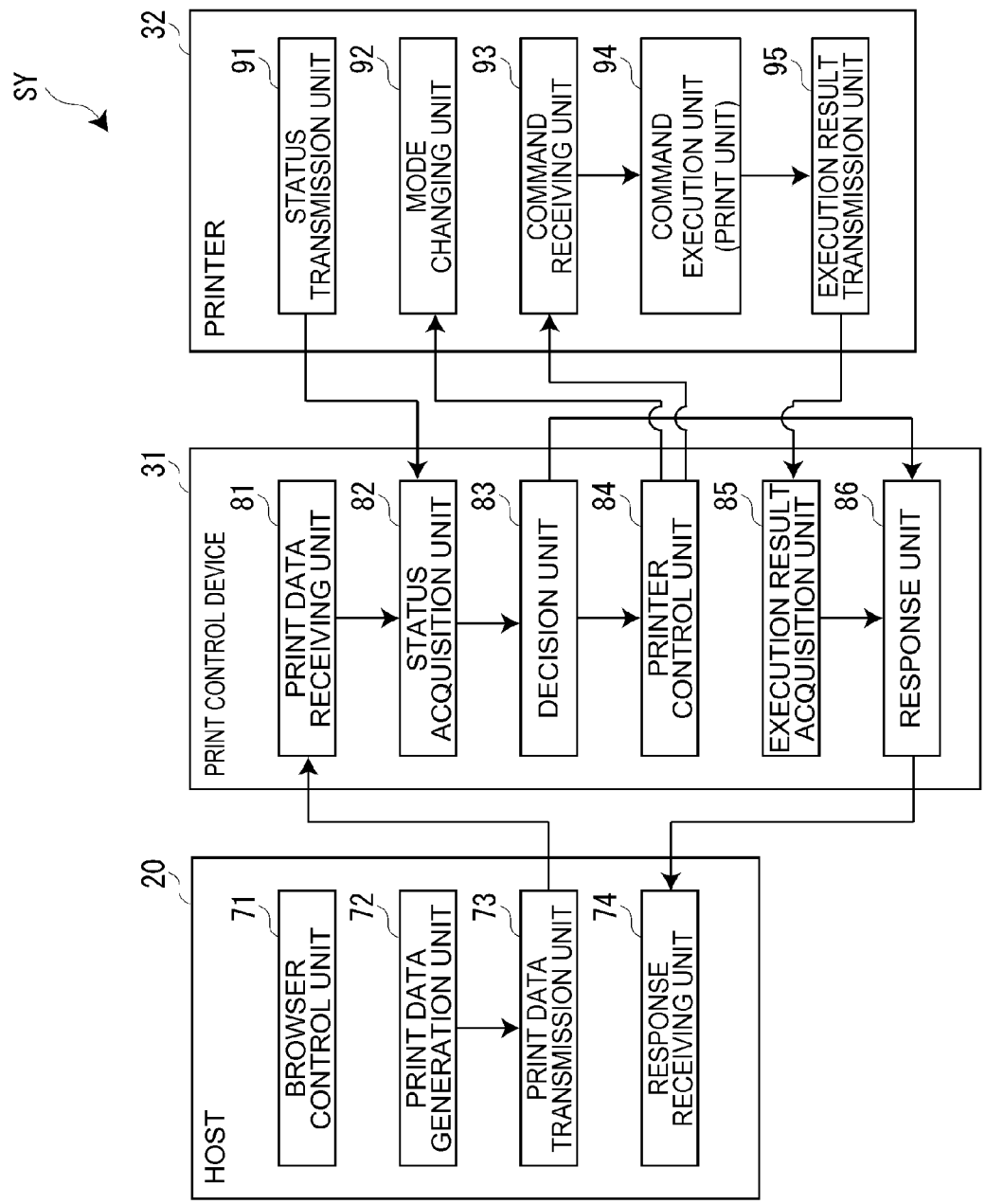
FIG. 5 is a function block diagram of a printing system.

The functional configuration of the printing system SY is described next with reference to FIG. 5. The main functional components of the host 20 include a browser control unit 71, print data generation unit 72, print data transmission unit 73, and response receiving unit 74.

The browser control unit 71 controls the web browser 27. The print data generation unit 72 generates print data written in XML using a print control script that runs on the web browser 27. The print data transmission unit 73 sends the generated print data to the print control device 31. The response receiving unit 74 receives response data (including decision results from the print control device 31, the results of command execution by the printer 32, and status reports) from the print control device 31 as an XML document.

The main functional components of the print control device 31 include a print data receiving unit 81 (reception unit), status acquisition unit 82, decision unit 83, printer control unit 84, execution result acquisition unit 85, and response unit 86.

The print data receiving unit 81 receives print data from the host 20. Mode information is included in the print data. Mode information in this embodiment is information identifying either a normal transmission mode or a forced transmission mode. The normal transmission mode is the mode for sending normal commands (such as print execution commands) to a printer 32 in the on-line state. The forced transmission mode is a mode for sending print control commands unconditionally to a printer 32 that is off-line or has reported an error. Print data includes error recovery commands, drawer kick commands, and other commands in addition to print commands. Note that a drawer kick command is a command for opening a cash drawer (not shown in the figure) connected to the printer 32. When the printer 32 receives a drawer kick command, it outputs a drawer open command to the cash drawer. Note that a configuration in which the cash drawer is connected to the print control device 31, and the print control device 31 outputs the drawer open command to the cash drawer, is also conceivable.

The status acquisition unit 82 acquires the state (status) of the printer 32 by sending a status acquisition command to the printer 32. In this embodiment, a signal denoting the off-line status or on-line status is acquired as the printer status. The decision unit 83 determines if the mode information contained in the print data and the status of the printer 32 meet the execution conditions. More specifically, if the mode information denotes the forced transmission mode and the printer 32 is off-line, the decision unit 83 determines a first execution condition (referred to in the claims as the "execution condition") is met. If the mode information denotes the normal transmission mode and the printer 32 is on-line, the decision unit 83 determines a second execution condition is met.

When the decision unit 83 determines the first execution condition is met, the printer control unit 84 changes the printer 32 to a specific mode and then sends a print control command (ESC/POS® command) generated from the print data to the printer 32. In this embodiment, the printer 32 changes to a real-time command execution mode as the specific mode. A real-time command is a command instructing immediate execution by the printer 32. Note that in this example the printer 32 can switch to the real-time command execution mode or a normal command execution mode. When the decision unit 83 determines the second execution condition is met, the printer control unit 84 sends the print control command generated from the print data to the printer 32 without changing the mode of the printer 32. In addition, if the decision unit 83 determines that both the first execution condition and the second execution condition are not met, the printer control unit 84 does not send a print control command to the printer 32.

The execution result acquisition unit 85 gets the execution result (response) of the print control command from the printer 32. The response unit 86 sends the execution result to the host 20. When the decision unit 83 determines that both the first execution condition and the second execution condition are not met, the response unit 86 sends response data reporting the same to the host 20.

As described above, these parts 81 to 86 of the print control device 31 are embodied as web services. Because there are plural print web services (see FIG. 4), the print control device 31 can process print data for plural jobs in parallel. Note that the print data for plural jobs could be print data sent from plural hosts, or print data for plural jobs (plural requests from the same program) sent from a single host.

The main functional blocks of the printer 32 include a status transmission unit 91, mode changing unit 92, command receiving unit 93, command execution unit 94, and execution result transmission unit 95.

The status transmission unit 91 sends a signal denoting the status of the printer 32 to the print control device 31 in response to a status acquisition command sent from the print control device 31. The mode changing unit 92 changes the mode of the printer 32 to the real-time command execution mode or the normal command execution mode.

The command receiving unit 93 receives print control commands sent from the print control device 31 (printer control unit 84). The command execution unit 94 executes the received print control command. Executing a print control command includes printing operations and error recovery operations. Therefore, if the print control command is a print execution command, the command execution unit 94 functions as a print unit. The execution result transmission unit 95 sends the result of executing the print control command to the print control device 31.

Figure 6:
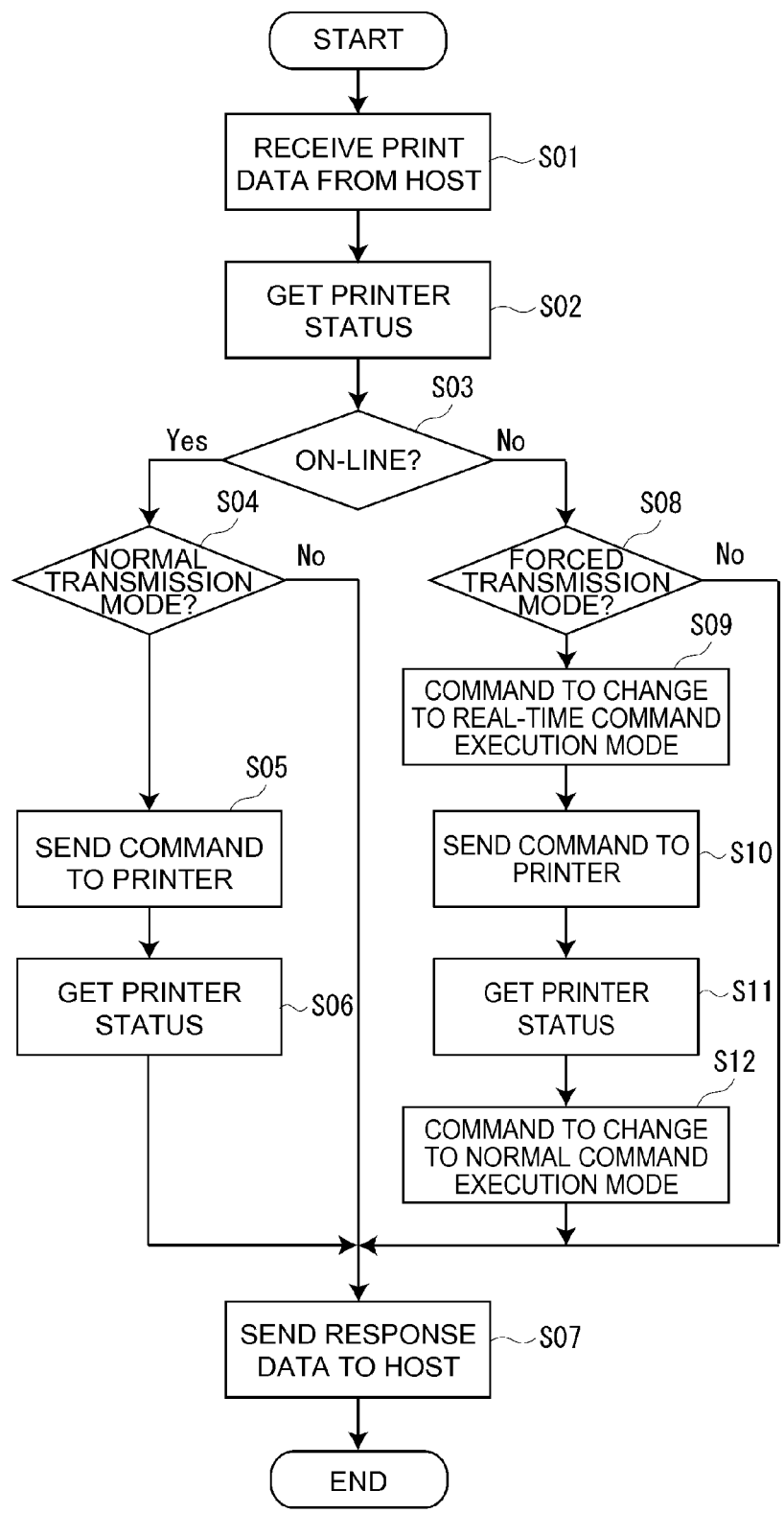
FIG. 6 is a flow chart showing the operation of the print control device.

Operation of the print control device 31 is next with reference to FIG. 6. When the print control device 31 receives print data from the host 20 (S01), the print control device 31 sends a status acquisition command to the printer 32, and gets the status of the printer 32 (S02). Based on the received status, the print control device 31 determines if the printer 32 is on-line or not (S03), and if the printer 32 is on-line (S03 returns YES), determines if the mode information contained in the print data denotes the normal transmission mode (S04). If the normal transmission mode is detected (S04 returns YES), the print control device 31 generates and sends normal commands based on the print data to the printer 32 (S05), and gets the status from the printer 32 (S06). This status includes information indicating if printing was successful or failed. The print control device 31 then sends the command execution result (printing successful or printing failed) as response data to the host 20 (S07).

If the normal transmission mode is not detected in S04 (S04 returns NO), the print control device 31 sends a signal indicating that the execution condition is not met (that the printer 32 is on-line) to the host 20 without sending a command to the printer 32 (S07).

If in S03 the printer is determined to not be on-line (S03 returns NO), the print control device 31 determines if the mode information contained in the print data indicates the forced transmission mode (S08). If the forced transmission mode is detected (S08 returns YES), the print control device 31 first sends a change mode command (a command to change to the real-time command execution mode) to the printer 32 (S09), and after the printer 32 finishes changing mode, generates and sends a real-time command (such as an error recovery command) based on the print data to the printer 32 (S10). By thus changing the printer 32 to the real-time command execution mode, the printer 32 can execute print control commands even when off-line. When the status is then acquired from the printer 32 (S11), the print control device 31 resends the change mode command (a command to change to the normal command execution mode) to the printer 32 (S12). The print control device 31 then sends the command execution result (whether error recovery was successful or failed, for example) as the response data to the host 20 (S07).

If the forced transmission mode is not detected in S08 (S08 returns NO), the print control device 31 sends a signal indicating that the execution condition is not met (that the printer 32 is off-line) to the host 20 without sending a command to the printer 32 (S07).

Specific examples of print data are described next with reference to FIG. 7. Note that as described above the print data is written in XML. Note further that text following a bullet (•) is explanatory text and is information that is not included in the actual print data. Block (a) in FIG. 7 shows an example of print data sent during a normal transmission. A <print> tag is used in the normal transmission mode. In the example shown in the figure, drawer kick, print text, line feed, print barcode, and paper cut commands are contained in the print data. Based on the print data, the print control device 31 generates print control commands corresponding to each command.

Block (b) in FIG. 7 shows an example of print data that is sent in the forced transmission mode. In the forced transmission mode the <print force="true"> tag is used. In this example, an error recovery command is included in the print data. Based on this error recovery command, the print control device 31 generates error recovery and clear buffer (deleting print data in the buffer 54 of the printer 32) print control commands.

FIG. 7 block (c) shows an example of print data when outputting commands according to the mode information. In the example in the figure both the <print> tag and the <print force="true"> tag are included in the print data. In this event, if the printer 32 is on-line, the print control device 31 converts and sends the drawer kick command in the <print> element to a normal command to the printer 32, and ignores commands in the <print force="true"> element. If the printer 32 is off-line, the print control device 31 converts the drawer kick command in the <print force="true"> element to a real-time command and sends the real-time command to the printer 32, and ignores commands in the <print> element.

In FIG. 7, block (d) shows an example of print data containing commands that are valid in an off-line state. In the example shown in the figure, drawer kick, error recovery, and stop buzzer commands are contained in the print data. Based on the print data, the print control device 31 generates print control commands corresponding to each of the commands (print control commands including drawer kick, start buzzer, error recovery and buffer clear, and stop buzzer commands).

The process flow when an error occurs is described with reference to FIG. 8. In FIG. 8, block (a) shows the flow of the process when an error occurs. In this example a print command from host A is executed, and an error occurs while printing. In this event, the printer 32 sends a status signal indicating that an error occurred to the print control device 31, and the print control device 31 sends response data indicating the error to the host 20. Even if a print command is asserted from host B in this state, the printer 32 is off-line, and response data reporting that the execution condition is not met is sent to the host 20 without a print control command being sent from the print control device 31 to the printer 32. As a result, host B waits to print.

FIG. 8B shows the process flow when recovering from an error. When an error occurs in the printer 32, host A selects the forced transmission mode and asserts an error recovery command. The print control device 31 generates an error recovery command (real-time command) based on the error recovery command from the host. As a result, the printer 32 is reset and the error is cleared. These steps enable printing in response to another print command from host B.

As described above, when print data is received from a host 20, the print control device 31 in the above embodiment evaluates the execution condition that the mode information is set to the forced transmission mode and the printer 32 is off-line, and if this execution condition is met, changes the printer 32 to the real-time command execution mode and sends a real-time command generated from the print data. As a result, even if the printer 32 is off-line, desired print control commands such as an error recovery command can be executed. If the execution condition is not met, the print control device 31 does not send a command to the printer 32, and can therefore prevent erroneous operation of the printer 32. In addition, because print control commands are generated based on the mode information when converting print data to print control commands, the print control device 31 can use the same elements in plural different modes.

Furthermore, because the mode information being set to the normal transmission mode and the printer 32 being on-line is the condition for normal command transmission, even if the print control device 31 is connected to plural hosts 20 and print data for plural print jobs can be processed in parallel, a print recovery process from one host 20 will not interfere with print commands from other hosts 20.

Furthermore, because the host 20 generates print data using a script that runs on a web browser 27, a printer driver or plugin is not needed. In addition, because the host 20 can run on any platform, a mixture of hosts 20 that operate on different operating systems, including smartphones and tablet computers, can be used in the same printing system SY.

The mode of the printer 32 can change to a real-time command execution mode or a normal command execution mode in the above example, but the printer 32 could also change to other modes such as a printer setup mode or a firmware update mode. In this event, mode information appropriate to each mode is also provided. A configuration in which the printer setup mode or firmware update mode are executed when the printer 32 is off-line is also conceivable. Configurations in which states other than on-line/off-line (when a specific button is pressed or a cover is open) are linked to the mode information as printer states (status), and can be set as execution conditions, are also conceivable.

Note that a standard browser is used as the web browser 27, and print data is generated using a print control script in the above embodiment, but the print data can be generated using a plugin or a rich Internet application.

The above embodiment describes a configuration in which plural hosts 20 and plural printers 32 are connected to a single print control device 31, but configurations in which plural printers 32 are shared by plural print control devices 31 are also conceivable. A robust printing system SY can be constructed by sharing printers 32 between redundant print control devices 31.

Components of the printing system SY described in the foregoing embodiments can also be rendered as a program. The program can also be stored and supplied on a suitable recording medium (CD-ROM or flash memory, for example). More specifically, a program that causes a computer to function as parts of the printing system SY, a program that causes a computer to execute the process steps of the printing system SY, and a recording medium storing these programs, are also included in the scope of the present disclosure.

A receipt printer is used as an example of a printer 32 in the foregoing embodiment, but the disclosure can also be applied to printers other than receipt printers. The foregoing embodiments also use JavaScript® as an example of a scripting language, but the disclosure can also be used with other programming languages. Other variations are also possible without departing from the scope of the present disclosure.

What is claimed is:

1. A print control method comprising:
  receiving print data written in a markup language, the print data including operating mode information;
  in response to receiving the print data, acquiring a status of a printer;
  determining if the acquired status of the printer is on-line or off-line;
  determining if an execution condition is satisfied based on the operating mode information included in the print data and the acquired status of the printer; and
  if the execution condition is satisfied and the acquired status of the printer is off-line, then sending to the printer a print control command generated based on the print data, and then changing the status of the printer to on-line;
  wherein the print control command sent to the printer is an online print control command executable when the printer is online.

2. The print control method described in claim 1, wherein:
  prior to sending to the printer the online print control command, the operating mode of the printer is changed to a real-time command execution mode, and
  the online print control command received by the printer is executed immediately regardless of whether the printer is off-line.

3. The print control method described in claim 2, wherein:
the operating mode information included in the print data specifies a forced-transmission mode indicating that the online print control command is to be sent to the printer when the printer is in the off-line state.

4. The print control method described in claim 3, further comprising:
acquiring the status of the printer after sending the online print control command, and then changing the status of the printer to on-line if the status of the printer is still off-line after execution of the sent online print control command.

5. A print control method for controlling a printing mechanism, said control method comprising the following steps:
(a) receiving print data including an online print control command and a header indicating a desired operating mode for the online print control command, said desired operating mode being one of at least a first operating mode, a second operating mode and a third operating mode, wherein:
  (i) said first operating mode is a normal command execution mode wherein the printing mechanism is in an on-line state, the online print control command sent to the printing mechanism is stored to a receive buffer, and the stored online print control command is executed in order from the receive buffer;
  (ii) said second operating mode is an offline mode wherein said printing mechanism is in an off-line state and not accepting the online print control command for execution;
  (iii) said third operating mode being a real-time command execution mode wherein said printing mechanism is in said off-line state, and the online print control command sent to the printing mechanism is executed immediately irrespective of the contents of the receive buffer;
(b) in response to receiving the print data indicating the desired operating mode, determining the current state of the printing mechanism, and
if the desired operation mode indicated by the print data is said real-time command execution mode and the determined current state of the printing mechanism is said off-line state, then commanding the printing mechanism to change to said real-time command execution mode and sending the online print control command included in the print data to the printing mechanism for immediate execution.

6. The print control method of claim 5, wherein:
upon completion of the execution of a last online print control command sent to the printing mechanism, the printing mechanism is commanded to exit the real-time command execution mode.

7. The print control method of claim 6, wherein:
when the printing mechanism is commanded to exit the real-time command execution mode, the printing mechanism is also commanded to change to the normal command execution mode.

8. The print control method of claim 5, wherein the online print control command sent to the printing mechanism in the normal command execution mode is the same as the online print control command sent to the printing mechanism in said real-time command execution mode.

9. The print control method of claim 5, wherein in step (b), if the desired operation mode indicated by the print data is said real-time command execution mode and the determined current state of the printing mechanism is said on-line state, then maintaining the operation mode of the printing mechanism unchanged and not sending the online print control command included in the print data to the printing mechanism for execution.

10. The print control method of claim 5, wherein in step (b), if the desired operation mode indicated by the print data is said real-time command execution mode and the determined current state of the printing mechanism is said on-line state, then further outputting to a host device a signal indicating that a command-execution condition is not met and not altering the current operation mode of the printing mechanism and not sending to the printing mechanism the online print control command included in the print data.

11. The print control method of claim 5, wherein in step (b), if the desired operation mode indicated by the print data is said normal command execution mode and the determined current state of the printing mechanism is said off-line state, then maintaining the operation mode of the printing mechanism unchanged, not sending the online print control command to the printing mechanism for execution, and outputting to a host device a signal indicating that a command-execution condition is not met.

12. The print control method of claim 5, wherein:
the received print data includes a list of instructions, and the online print control command is a control command to control the printing mechanism to execute the list of instructions;
the print data is written in a markup language, and the list of instructions are encapsulated between a pair of markup language tags that identify the list of instructions as being print-related instructions; and
said pair of markup language tags further specify the desired operating mode.

* * * * *